United States Patent [19]
Kato et al.

[11] Patent Number: 5,800,787
[45] Date of Patent: Sep. 1, 1998

[54] ELECTRICALLY HEATABLE HONEYCOMB BODY

[75] Inventors: Yasushi Kato, Handa; Shigeharu Hashimoto, Okazaki; Yoshinobu Watanabe, Iwakura, all of Japan

[73] Assignee: NGK Insulators, Ltd., Japan

[21] Appl. No.: 621,313

[22] Filed: Mar. 25, 1996

[30] Foreign Application Priority Data

Mar. 30, 1995 [JP] Japan ................... 7-073127

[51] Int. Cl.⁶ ........................................ F01N 3/24
[52] U.S. Cl. ................... 422/174; 219/205; 219/552; 392/488; 422/177; 422/179; 422/180
[58] Field of Search ................... 422/174, 175, 422/177, 179, 180; 428/116; 60/300; 502/527, 439; 219/552, 205; 392/488

[56] References Cited

U.S. PATENT DOCUMENTS

| Re. 35,134 | 12/1995 | Mitzuno et al. |
| 4,233,351 | 11/1980 | Okumura et al. |
| 5,202,547 | 4/1993 | Abe et al. |
| 5,399,841 | 3/1995 | Abe et al. |

FOREIGN PATENT DOCUMENTS

| 0283220 | 9/1988 | European Pat. Off. |
| 0502731 | 9/1992 | European Pat. Off. |
| 0661097 | 7/1995 | European Pat. Off. |
| 3119302 | 2/1982 | Germany. |
| 4-224220 | 8/1992 | Japan. |
| 7-163888 | 6/1995 | Japan. |

Primary Examiner—Timothy McMahon
Attorney, Agent, or Firm—Parkhurst & Wendel

[57] ABSTRACT

An electrically heatable honeycomb body includes a plurality of passages which are each defined by partition walls made of an electroconductive material and which are substantially parallel to the direction of a gas flowing through the honeycomb body, and two ends which are the gas inlet and outlet sides of honeycomb body, wherein the heat generation of the honeycomb body by electrification is controlled by adjusting the flow of electricity therein and wherein those cells each constituted by a passage and partition walls, present in the vicinity of each current-concentrating portion are formed in such a structure that the stress caused by current concentration can be reduced. This honeycomb body can reduce the stress caused by current concentration and thereby can prevent the rupture of its cells.

14 Claims, 14 Drawing Sheets

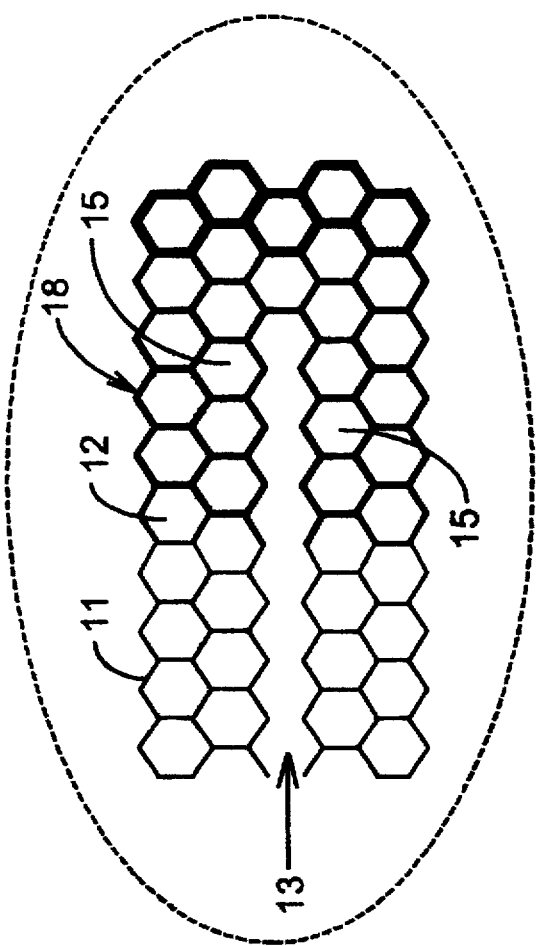
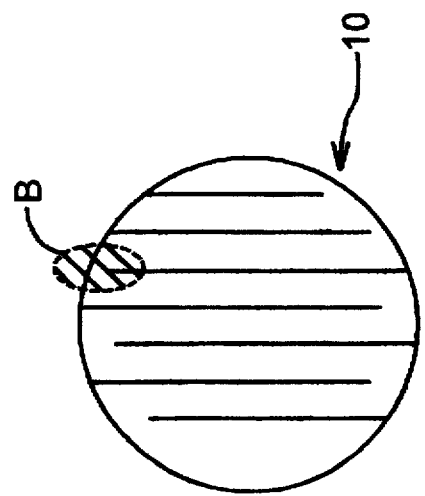

Fig. 6
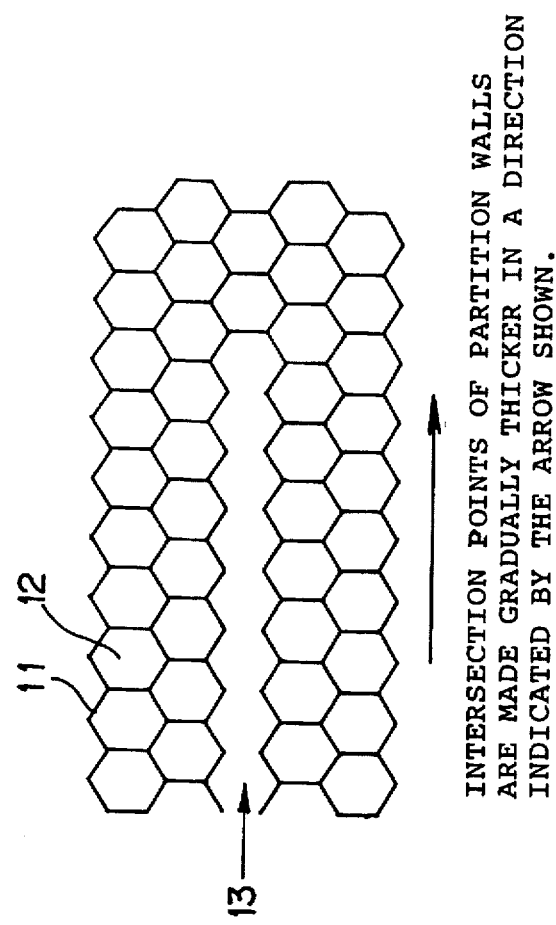
INTERSECTION POINTS OF PARTITION WALLS ARE MADE GRADUALLY THICKER IN A DIRECTION INDICATED BY THE ARROW SHOWN.
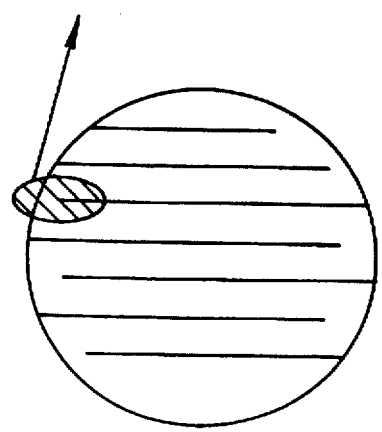

ELECTRICALLY HEATABLE HONEYCOMB BODY

BACKGROUND OF THE INVENTION

1. Field of the Invention

The present invention relates to an electrically heatable honeycomb body. More particularly, the present invention relates to a honeycomb body favorably used as a honeycomb heater for, for example, purification of the exhaust gas emitted during the cold start of an automobile.

2. Description of the Related Art

In recent years, metallic honeycomb structures have drawn attention as a catalyst, a catalyst carrier or the like used for purification of the nitrogen oxides (NOx), carbon monoxide (CO) and hydrocarbons (HC) present in the exhaust gases emitted from the internal engines of automobiles, etc.

As the control for such exhaust gases has become stricter, development of a heater, etc. capable of reducing emissions during the cold start of an engine has become increasingly important.

In order to respond to such a demand, the present applicant proposed heaters such as mentioned below.

Japanese Patent Application Kokai (Laid-Open) No. 224220/1992 proposed a honeycomb heater comprising (a) a honeycomb structure and (b) electrodes, wherein slits as a resistance-adjusting means were provided in the honeycomb structure between the electrodes. This heater can quickly heat the low-temperature exhaust gas emitted during engine start.

Japanese Patent Application Kokai (Laid-Open) No. 277481/1992 proposed a honeycomb heater as shown in FIG. 23, wherein the partition wall "a" at the dead end of each slit 100 (where a current tends to concentrate most) and the partition walls "b" at both sides of each slit (where current concentrates at a relatively high degree) were made thicker with an electroconductive material; and a honeycomb heater as shown in FIG. 24, wherein the passages "d", "f" and "h" (where a current is concentrated) were sealed with an electroconductive material. In these honeycomb heaters, the partition walls at the dead end of each slit (where current concentrates most) or at the portion surrounding each slit end (where a current concentrates at a relatively high degree) were made thicker or sealed. It was found, however, that the portion showing a higher temperature rise during electrification was not the cells at each slit end but was the cells at the both sides of each slit end. Therefore, the above technique is insufficient for preventing of abnormally high heat generation at current-concentrating portions.

Japanese Patent Application Kokai (Laid-Open) No. 66132/1994 proposed a honeycomb heater wherein the polygonal section of each cell undergoing larger thermal shock and generating a higher thermal stress was formed so as to have a side of 10 mm or less in order to relax the thermal shock and prevent the deformation, cracking, etc. of the cell. However, when this honeycomb heater was actually electrified, cell deformation occurred at the cells an both sides of each slit end where current concentration took place, and a higher stress appeared at these cells. Therefore, it is necessary to take an appropriate countermeasure to prevent the deformation of such cells and reduce their thermal stress.

Japanese Patent Application Kokai (Laid-Open) No. 163888/1995 proposed a honeycomb heater whose thickness in the direction of gas flow was made smaller at a particular position so as to allow quick local heating. In this heater, however, since the thickness changes sharply from that particular position, current concentration occurred at that position at times during electrification.

As described above, when a honeycomb structure is electrified, there appears (appear) a current-concentrating portion(s). Such portion(s) is (are) in the vicinity of each slit end in the case of a honeycomb structure having slit(s) and, in the case of a honeycomb structure of vortex type, the center thereof. When the honeycomb structure is subjected to repeated electrification, cell rupture occurs at the current-concentrating portion(s) of the honeycomb structure, which may finally lead to no flow of electricity.

OBJECT AND SUMMARY OF THE INVENTION

The present inventors made further study and, as a result, found out that some of the cells at the both sides of each slit end was high in thermal stress and temperature when electrified and showed cell deformation, as shown in FIG. 25. In the techniques proposed heretofore, it had been thought that current concentration occurs at each slit end and that the modification of the slit end is necessary. It has been found out, however, that even if overheating takes place at the slit end owing to current concentration, it causes no serious problem because the generated heat is dissipated from the slit end toward the lower-temperature-portion adjacent to the slit end and closer to the circumference of honeycomb body.

Hence, the object of the present invention is to provide an electrically heatable honeycomb body having further improvement for cell rupture during repeated electrification.

According to the present invention there is provided an electrically heatable honeycomb body comprising:

a large number of passages which are each defined by partition walls made of an electroconductive material and which are substantially parallel to the direction of a gas flowing through the honeycomb body, and two ends which are the gas inlet and outlet sides of honeycomb body, wherein the heat generation of honeycomb body by electrification is controlled by adjusting the flow of electricity therein and wherein those cells each constituted by a passage and partition walls, present in the vicinity of each current-concentrating portion are formed in such a structure that the stress caused by current concentration can be reduced.

According to the present invention there is also provided an electrically heatable honeycomb body comprising:

a large number of passages which are each defined by partition walls made of an electroconductive material and which are substantially parallel to the direction of a gas flowing through the honeycomb body, and two ends which are the gas inlet and outlet sides of honeycomb body, wherein the heat generation of honeycomb body by electrification is controlled by adjusting the flow of electricity therein and wherein at least one slit is formed to adjust the flow of electricity in the honeycomb body and the partition wall lengths of each cell present at the dead end of the slit and in the slit extension line are made larger in the slit width direction to prevent the cell-to-cell contact between the cells present at the both sides of each slit end during the heat generation by electrification.

BRIEF DESCRIPTION OF THE DRAWINGS

FIGS. 2A–B are sectional views showing an example of the electrically heatable honeycomb body of the present invention wherein slits are formed in parallel to the passages for resistance adjustment.

FIG. 6 is a sectional views showing an example of the electrically heatable honeycomb body of the present invention wherein the shape of each intersection point of cell partition walls at each slit end is changed.

DETAILED DESCRIPTION OF THE INVENTION

Figure 1:
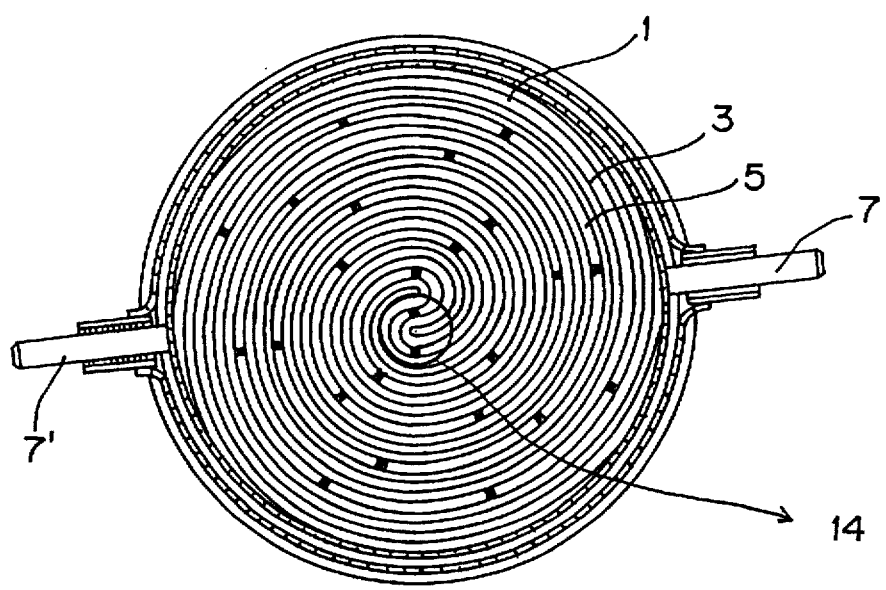
FIG. 1 is a sectional view showing a heater containing therein a honeycomb body formed by winding foil type thin plates into a vortex shape.

In the electrically heatable honeycomb body of the present invention, improvement was made for the portions of honeycomb body where current concentration takes place during electrification and thereby higher thermal stress, higher temperature and cell deformation are invited, by (1) lowering the temperature, (2) reducing the thermal stress and (3) minimizing the cell deformation, of said portions of honeycomb body.

Also in the electrically heatable honeycomb body of the present invention having slits, improvement was made to prevent cell-to-cell contact between the cells present on both sides of each slit end during the heat generation by electrification, by making larger the partition wall lengths of each cell present at the dead end of each slit and in the slit extension line, in the slit width direction.

In the present electrically heatable honeycomb body, specific examples of the "cell structure in which the stress caused by current concentration can be reduced" are as follows.

(1) The thicknesses of those partition walls present in the vicinity of each current-concentrating portion are made larger than the thicknesses of the partition walls at other portions.

(2) The thicknesses of those partition walls present in the vicinity of each current-concentrating portion and in the portion extending therefrom toward the circumference of honeycomb body are gradually made larger as the partition walls are closer to the circumference.

(3) At least one slit is formed in the present honeycomb body so as to control the heat generation of honeycomb body and the thicknesses of those partition walls present at the portion surrounding each slit end are made larger than the thicknesses of the partition walls at other portions.

(4) At least one slit is formed in the present honeycomb body so as to control the heat generation of honeycomb body and the thicknesses of those partition walls present at the portion surrounding each slit end are made larger at the intersection points of such partition walls.

(5) In the above (4), the thicknesses of the intersection points of partition walls are made gradually larger as the intersection points are closer to the circumference of honeycomb body.

(6) At least one slit is formed in the present honeycomb body so as to control the heat generation of honeycomb body and each cell present at the portion surrounding each slit end is provided with a rib for reinforcement.

(7) At least one slit is formed in the present honeycomb body so as to control the heat generation of the honeycomb body and those passages present at the portion surrounding each slit end are sealed with an electroconductive material.

(8) Those cells present in the vicinity of each current-concentrating portion are formed in a structure capable of withstanding deformation and the cells at other portions are formed in an easily deformable and flexible structure.

(9) At least one slit is formed in the present honeycomb body so as to control the heat generation of honeycomb body and those cells present at the portion surrounding each slit end are formed in a structure capable of withstanding deformation and the cells at other portions are formed in an easily deformable and flexible structure.

(10) In the above (8) or (9), the cells of a structure capable of withstanding deformation have a tegragonal section and the cells of an easily deformable and flexible structure have a hexagonal section.

(11) At least one slit is formed in the present honeycomb body so as to control the heat generation of the honeycomb body and those cells present at the portion surrounding each slit end are provided in a more packed state than the cells at other portions.

(12) At least one of the two ends of the present honeycomb body, i.e. the gas inlet side and/or the gas outlet side is formed so as to be hollow at the center.

In the present electrically heatable honeycomb body comprising a large number of passages, the thicknesses and/or shapes of the partition walls at each honeycomb body portion which is liable to cause cell rupture during repeated electrification, have been changed to prevent cell rupture.

Figure 11:
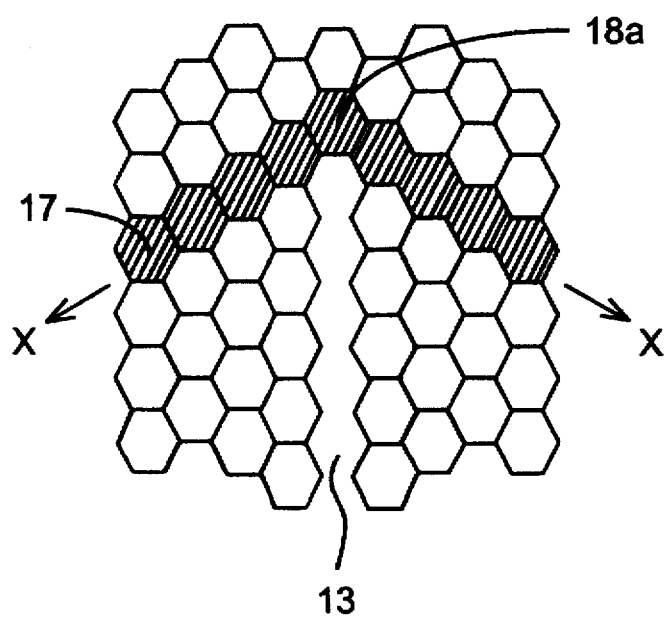
FIG. 11 is a sectional view showing an example of the electrically heatable honeycomb body of the present invention wherein the passages at the portion surrounding each slit end are sealed with an electroconductive material.
Figure 23:
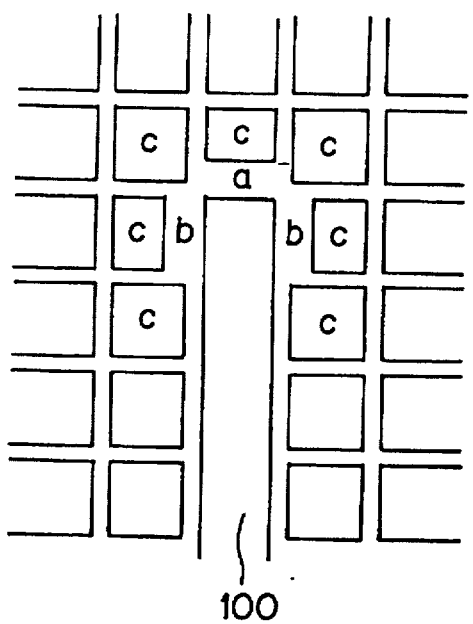
FIG. 23 is a fragmentary view showing each slit end in a conventional electrically heatable honeycomb body.
Figure 24:
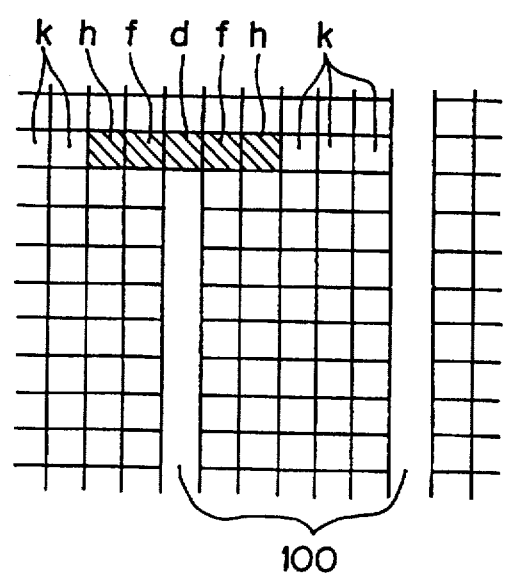
FIG. 24 is a fragmentary view showing each slit end in a conventional electrically heatable honeycomb body.

In a conventional resistance-adjusting type heater as shown in FIG. 23, abnormally high heat generation is prevented by increasing the thicknesses of the partition walls "a" and "b" where current concentration takes place, or by sealing the passages of each current-concentrating portion with an electroconductive material. As mentioned previously, however, a detailed study by the present applicants indicated that the portions showing a larger temperature increase during electrification are the cells located on both sides of each slit end and that the above countermeasure for abnormally high heat generation is insufficient and may have durability problems (e.g. cracking) in long-term use. Also in a conventional heater as shown in FIG. 24, not only the cell at the dead end of each slit but also the few cells adjacent thereto in a direction perpendicular to the direction of slit extension are sealed with an electroconductive material. However, since it was found that in this heater, a current flows obliquely upward to each slit end and then obliquely downward therefrom, it is desirable to arrange the sealed cells as shown in FIG. 11.

Hence, in the present electrically heatable honeycomb body, change in thickness and/or shape of partition wall was made in the portions where current concentration takes place during repeated electrification, namely, the vicinity of each slit end in the case of slit-containing honeycomb body and, for example, the center in the case of vortex type honeycomb body, whereby stress relaxation, temperature reduction, prevention of cell deformation, etc. have been made possible and the durability to cell rupture during repeated electrification has been improved.

The material constituting the present honeycomb body is not restricted as long as it is a material capable of generating heat when electrified, i.e. an electroconductive material. It may be a metal or a ceramic with a metal being preferred for its mechanical strength. The honeycomb body made of a metal includes, for example, those made of stainless steel or a material having a composition represented by Fe-Cr-Al, Fe-Cr, Fe-Al, Fe-Ni, W-Co, Ni-Cr or the like. Of these honeycomb bodies, those made of Fe-Cr-Al, Fe-Cr or Fe-Al are preferred because of excellent heat resistance, oxidation resistance and corrosion resistance and low cost. The honeycomb body may be porous or nonporous. When a catalyst is loaded thereon, a porous honeycomb body is preferred because it has higher adhesivity to the catalyst layer loaded thereon and hardly gives rise to the peeling of the catalyst layer caused by the difference in thermal expansion between the honeycomb body and the catalyst layer.

Next, description is made on an example of the process for production of a metallic honeycomb body used as one type of the honeycomb body of the present invention.

First, a material metal powder is prepared using, for example, a Fe powder, an Al powder and a Cr powder, or a powder of an alloy thereof so that they give a desired composition. The material metal powder is then mixed with an organic binder (e.g. methyl cellulose or polyvinyl alcohol) and water. The resulting mixture is subjected to extrusion to obtain a honeycomb body of desired shape.

In the above mixing, it is preferable that the material metal powder is mixed with an antioxidant (e.g. oleic acid)

before being mixed with an organic binder and water, or that a material metal powder processed so as to have oxidation resistance is used.

The honeycomb body is fired at 1,000°–1,400° C. in a non-oxidizing atmosphere. Use of a non-oxidizing atmosphere containing hydrogen is preferable because the organic binder is decomposed and removed by the help of the catalytic action of Fe, etc. and, as a result, an excellent sintered honeycomb body is obtained.

When the firing temperature is lower than 1,000° C., the honeycomb body is not sintered. When the firing temperature is higher than 1,400° C., the sintered body obtained is deformed.

Preferably, the surfaces of the partition walls and pores of the sintered honeycomb body is coated with a heat-resistant metal oxide such as $Al_2O_3$, $Cr_2O_3$ or the like so that the honeycomb body can have improved heat resistance, oxidation resistance and corrosion resistance.

In the thus obtained honeycomb body is formed, for example, at least one slit as a resistance-adjusting means. As in the prior art, the slit can be formed in various directions, various positions and various lengths.

The thus obtained metallic honeycomb body is provided with an electrification means (e.g. electrodes) ordinarily at some of the partition walls at the circumference or inside the circumference, by brazing, welding or the like, to obtain a honeycomb heater capable of generating heat when electrified. The electrification means is not particularly restricted as long as it can supply an electric current from a power source to the honeycomb heater, and a preferable example is electrodes.

The metallic honeycomb body, when used as a heater, is preferably formed so as to have a total resistance of 0.001–0.5 Ω.

It is preferable to load a catalyst on the surfaces of the above metallic honeycomb body because when the resulting honeycomb body is used as a heater or a catalytic converter, a higher temperature can be obtained in the purification reaction (e.g. oxidation reaction) of exhaust gas.

The catalyst loaded on the surfaces of the metallic honeycomb body comprises a heat-resistant carrier having a large surface area and a catalyst component loaded thereon. The heat-resistant carrier having a large surface area is preferably an inorganic oxide, and typical examples thereof are $\gamma$-$Al_2O_3$, $TiO_2$, $SiO_2$-$Al_2O_3$ and lanthanum-cobalt of perovskite structure. The catalyst component includes, for example, noble metals such as Pt, Pd, Rh, Ir and the like; and base metals such as Cu, Cr, Co and the like. A catalyst comprising $\gamma$-$Al_2O_3$ and 10–100 g/ft$^3$ of Pt and/or Pd loaded thereon is preferable.

In the present invention, the shape of the honeycomb body is not particularly restricted. But, as an example, such a specific shape is preferable that the cell density is 6–1,500 cells/in$^2$ (0.9–233 cells/cm$^2$) and the partition wall thickness is 50–2,000 μm.

The partition walls, etc. constituting the present honeycomb body may be porous or nonporous as mentioned above and its porosity is not restricted. However, the porosity is preferably 0–50%, more preferably less than 25% in view of the strength, oxidation resistance and corrosion resistance. When a catalyst is loaded on the honeycomb body, the porosity of the honeycomb body is preferably 5% or more in view of the adhesion to the catalyst layer.

Incidentally, in the present invention, the honeycomb body refers to a one-piece structure having a large number of passages defined by partition walls. The external shape of the honeycomb body can be cylindrical, rectangular, oval or the like. The passages are preferably nearly parallel to each other from the standpoint of, for example, pressure loss The sectional shape of each passage (i.e. cell shape) may be any desired one such as circular, polygonal, corrugated or the like.

In the present invention, the material used for increasing the thicknesses of particular partition walls and/or the electroconductive material used for sealing particular passages have no restriction as to their kinds as long as they are electroconductive. However, they are preferably the same material or the same type of material as the material constituting the partition walls in view of the productivity and the adhesion to the partition walls.

The present invention is hereinafter described by Examples with reference to the accompanying drawings. However, the present invention is not restricted to the Examples.

FIG. 1 is a sectional view showing a heater containing therein a honeycomb body formed by winding foil type thin sheets into a vortex shape. In FIG. 1, 1 is a honeycomb body having two ends, which comprises a number of metal sheets 3 provided in layers in a pattern to form a large number of gas passages 5 stretching from one end to the other end of the body. The metal sheets 3 are ordinarily constituted by planar sheets and corrugated sheets arranged alternately.

In the honeycomb body 1, a number of metal sheets 3 are wound in a "S" shape, and an electric current is passed between electrodes 7 and 7' to generate heat in the body.

Figure 3:
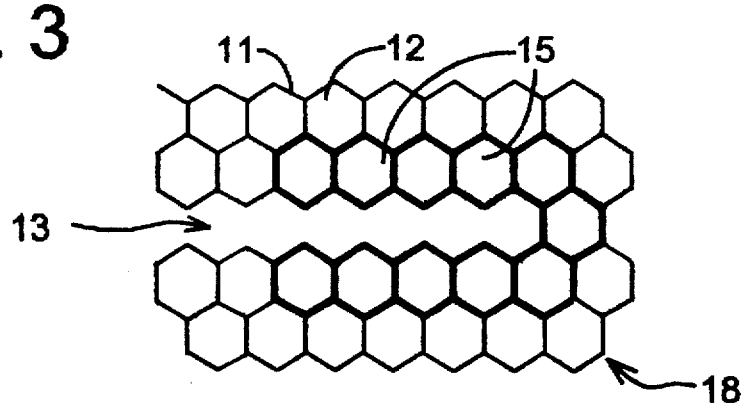
FIG. 3 is a sectional view showing an example of the electrically heatable honeycomb body of the present invention wherein slits are formed in parallel to the passages for resistance adjustment.

FIGS. 2A–B and 3 are each a sectional view showing an example of the electrically heatable honeycomb body of the present invention wherein slits are formed in parallel to the passages for resistance adjustment. 10 is a honeycomb body which has a large number of passages 12 each defined by partition walls 11 made of an electroconductive material and each provided substantially parallel to the direction of a gas flowing through the honeycomb body and which has two ends, i.e. a gas inlet side and a gas outlet side. In this honeycomb body, slits are formed in parallel to the passages 12. 18 are cells each constituted by a passage and partition walls.

In such a honeycomb body 10, current concentration and consequent cell temperature rise take place during repeated electrification at particular portions, for example, at the center 14 in the case of the vortex type honeycomb body of FIG. 1 and at the portion 15 surrounding each slit end in the case of the slits-containing honeycomb body of FIG. 2B or 3. However, the current density and temperature at the portion 15 can be reduced by increasing the thickness of each partition wall 11 of the portion. By thus increasing the thickness of the partition wall 11, cell deformation can be reduced and stress concentration can be relaxed.

Japanese Patent Application Kokai (Laid-Open) No. 277481/1992, increase in thickness of partition wall is restricted to the cells at the dead end of each slit. In contrast, in the present Examples, improvement was made based on the finding that stress concentration takes place more at the sides of each slit end rather than at the dead end. That is, in the present Examples, the portion 15 surrounding each slit end refers to 4 or more cells, preferably 5–6 cells present at each side of the end of each slit 13 although the number of these cells differs by the cell density (size of passage) of honeycomb body.

In the present Examples, the increase in partition wall thickness at the portion surrounding each slit end is preferably 20–40% of the partition wall thickness at other portions.

In the Example of FIG. 2B, increase in partition wall thickness is employed not only at the current-concentrating portion but also at the portion extending therefrom toward the circumference of honeycomb body, and the thickness of partition wall is gradually made larger as the partition wall is closer to the circumference. In this case, the degree of gradual increase in partition wall thickness in direction toward circumference is preferably 2–10% per one cell. Further in this case, the current density at the portion closer to the circumference is lower and the temperature at the portion is lower than that at the current-concentrating portion, whereby the heat generated at the current-concentrating portion can be quickly dissipated toward the circumference.

Figure 4A:
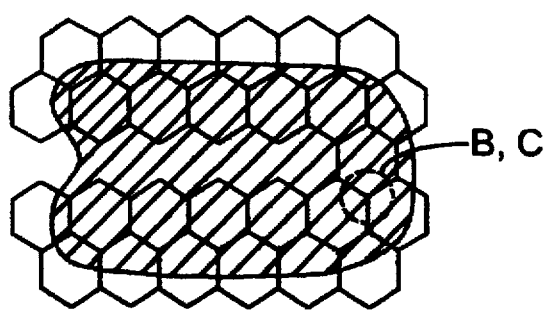
FIGS. 4A–C are sectional views showing an example of the electrically heatable honeycomb body of the present invention wherein the shape of each intersection point of cell partition walls at each slit end is changed.
Figure 4B:
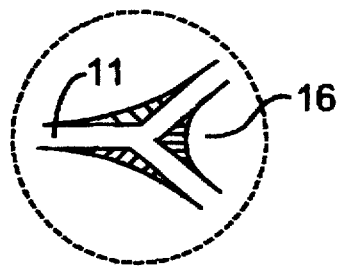
Figure 4C:
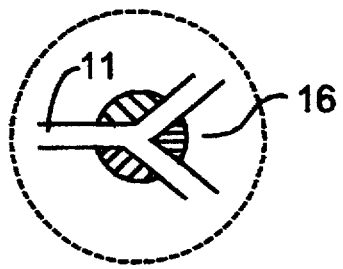
Figure 5:
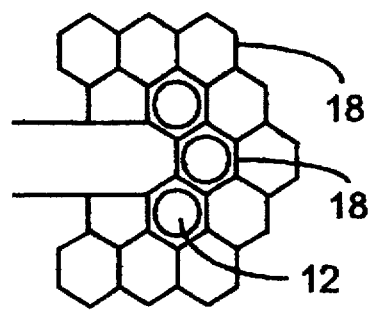
FIG. 5 is a sectional view showing an example of the electrically heatable honeycomb body of the present invention wherein the shape of each intersection point of cell partition walls at each slit end is changed.

FIGS. 4–6 are each a sectional view showing an example of the electrically heatable honeycomb body of the present invention wherein the shape of each intersection point of cell partition walls at the portion surrounding each slit end is changed. FIGS. 4 and 6 are each an example wherein the cell partition walls 11 at the portion surrounding each slit end have larger thicknesses at their intersection points 16, and FIG. 5 is an example wherein the passages 12 of the cells 18 at the portion surrounding each slit end have round sections.

In these honeycomb bodies 10, stress at the intersection points where stress concentration takes place, can be relaxed and cell rupture can be avoided by making larger the thicknesses of the areas at which current concentration and consequent cell temperature rise take place during repeated electrification, namely, the thicknesses of the intersection points 16 of partition walls at the portion surrounding each slit end in the case of the slits-containing honeycomb body of FIGS. 4B–C and, in the case of the vortex type honeycomb body of FIG. 1, the thickness of, for example, the intersection points at the center 14. It is also preferable to make gradually larger the thicknesses of intersection points 16 in a direction proceeding from each slit end toward the circumference of honeycomb body, as seen in FIG. 6. The degree of increase in thickness of intersection point at stress-concentrating portion is preferably 20–50% of the thickness before increase, i.e. the thickness of other portions. The degree of gradual increase in thickness of intersection point in a direction proceeding from each slit end toward the circumference is preferably 2–10% per one cell.

In the Examples shown in FIGS. 4 and 6, only the intersection points 16 of cell partition walls 11 are allowed to have larger thicknesses and, resultantly, decrease in current resistance is small. Hence, the resulting honeycomb body is suitable for use in a honeycomb heater for automobile which must have a high resistance during cold start.

Figure 7:
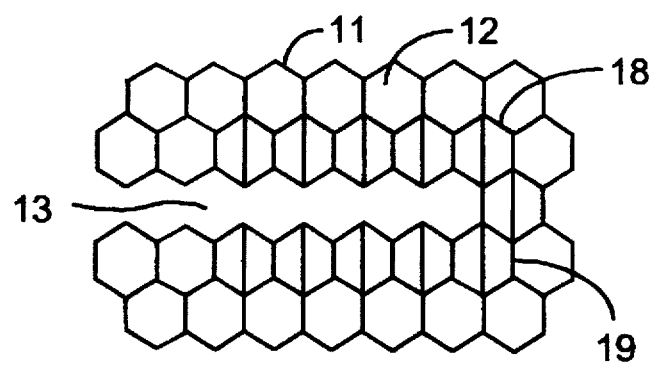
FIG. 7 is a sectional view showing an example of the electrically heatable honeycomb body of the present invention wherein the cells at the portion surrounding each slit end are each provided with a rib.
Figure 8:
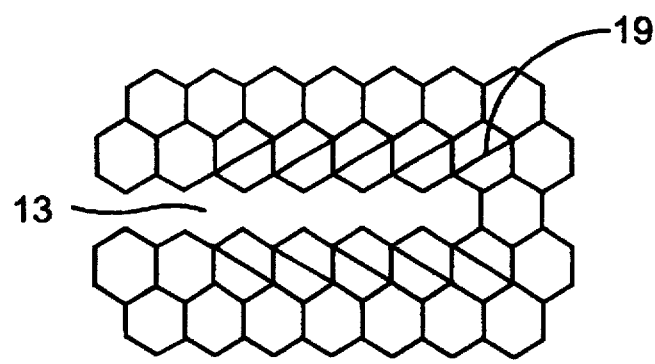
FIG. 8 is a sectional view showing an example of the electrically heatable honeycomb body of the present invention wherein the cells at the portion surrounding each slit end are each provided with a rib.
Figure 9:
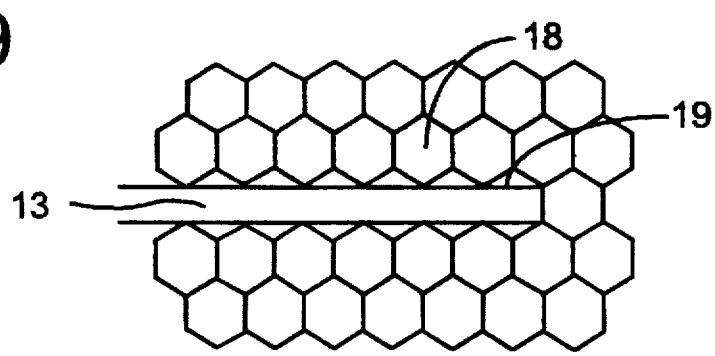
FIG. 9 is a sectional view showing an example of the electrically heatable honeycomb body of the present invention wherein the cells at the portion surrounding each slit end are provided with ribs.

FIGS. 7–9 are each a sectional view showing an example of the electrically heatable honeycomb body of the present invention wherein the cells at the portion surrounding each slit end are provided with ribs. The cells 18 forming the passages of the portion surrounding each slit end (current-concentrating portion when electrified) are provided with ribs 19 or the like for reinforcement. This results in increased number of ribs and serves for heat dissipation toward surrounding area, temperature reduction at current-concentrating portion and prevention of cell deformation at the portion, whereby stress concentration can be relaxed. In the Example of FIG. 9, linear ribs 19 are provided in the end of each slit 13 to prevent the deformation of the cells 18 present at the portion surrounding each slit end.

Figure 10:
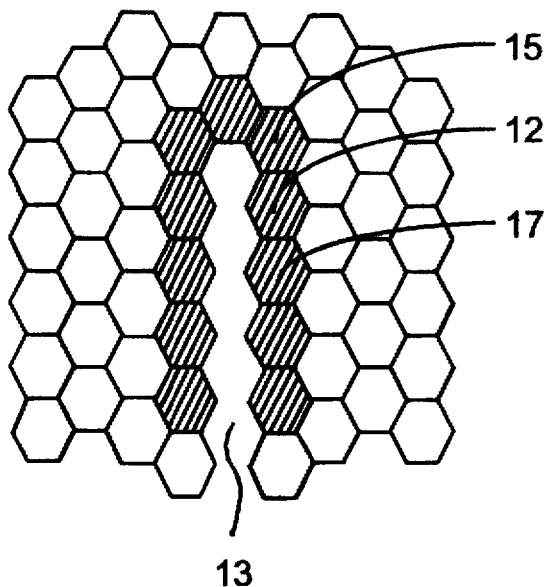
FIG. 10 is a sectional view showing an example of the electrically heatable honeycomb body of the present invention wherein the passages at the portion surrounding each slit end are sealed with an electroconductive material.

FIGS. 10 and 11 are each a sectional view showing an example of the electrically heatable honeycomb body of the present invention wherein the passages at the portion surrounding each slit end are sealed with an electroconductive material. The passages 12 of several cells at the portion surrounding each slit end (current-concentrating portion when electrified) are sealed with an electroconductive material 17. In FIG. 10, the passages 12 (shadowed) of cells at the portions surrounding each slit end, i.e. the portion where temperature rise occurs owing to current concentration, are sealed with an electroconductive material 17; in FIG. 11, the passages 12 (shadowed) of cells present at or near the dead end of each slit but present in the path of electricity are sealed with an electroconductive material 17.

Also in these cases, as in the Examples of FIGS. 7–9, there take place heat dissipation toward surrounding area, temperature reduction at current-concentrating portion and prevention of cell deformation at the portion, whereby stress concentration can be relaxed. The number of passages sealed with an electroconductive material 17 is preferably about 4–6 at one side of each slit end.

Incidentally, sealing of the passages at each current-concentrating portion with an electroconductive material is also disclosed in Japanese Patent Application Kokai (laid-Open) No. 277481/1992. As mentioned previously, the technique in the literature is insufficient as a countermeasure for prevention of abnormal heat generation and may have durability problems (e.g. cracking) in long-term use. The literature also gives a case of sealing, with an electroconductive material, the several passages at each slit end, arranged in a line perpendicular to the slit direction. Since an electric current flows, at the end of each slit, obliquely relative to the direction of each slit, the arrangement of sealed passages (sealed with an electroconductive material 17) as shown in FIG. 11, i.e. the arrangement of sealed passages from the cell 18a (starting point) to two diagonal directions X is preferable in view of heat dissipation and consequent prevention of cell deformation.

FIGS. 12–18 are each a sectional view showing an example of the electrically heatable honeycomb body of the present invention wherein the cells in the vicinity of each current-concentrating portion have a structure (e.g. a tetragon) capable of withstanding deformation and the cells at other portions have an easily deformable structure.

Herein, the "cell structure capable of withstanding deformation" refers to a cell structure of a polygonal shape having a small number of sides, for example, a triangle or a tetragon; or a cell structure of a high cell density, for example, 270–1,650 cells/in$^2$ (40–250 cells/cm$^2$). In contrast, the "easily deformable cell structure" refers to a cell structure of a polygonal shape having a large number of sides, for example, a hexagonal or higher polygon; or a cell structure of a cell density lower than that of the cell structure capable of withstanding deformation, for example, 200–550 cells/in$^2$ (31–85 cells/cm$^2$).

Figure 12:
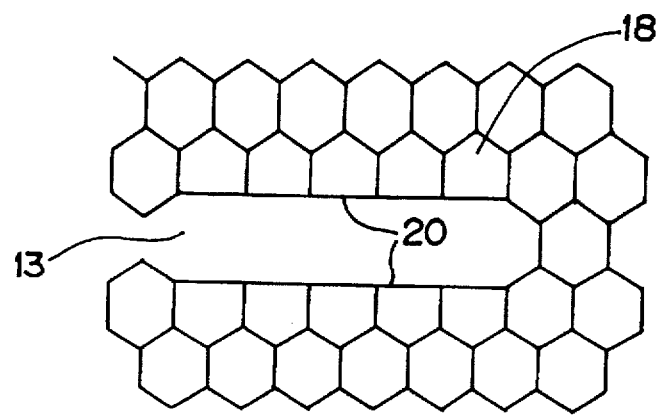
FIG. 12 is a sectional view showing an example of the electrically heatable honeycomb body of the present invention wherein the cells in the vicinity of each current-concentrating portion have a structure capable of withstanding deformation and the cells at other portions have an easily deformable structure.
Figure 13:
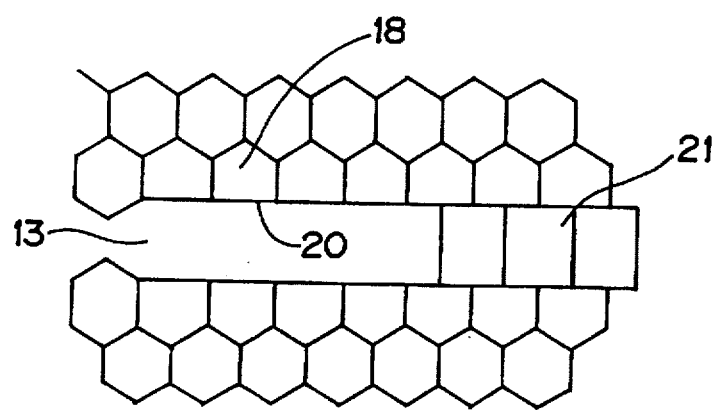
FIG. 13 is a sectional view showing an example of the electrically heatable honeycomb body of the present invention wherein the cells in the vicinity of each current-concentrating portion have a structure capable of withstanding deformation and the cells at other portions have an easily deformable structure.
Figure 14:
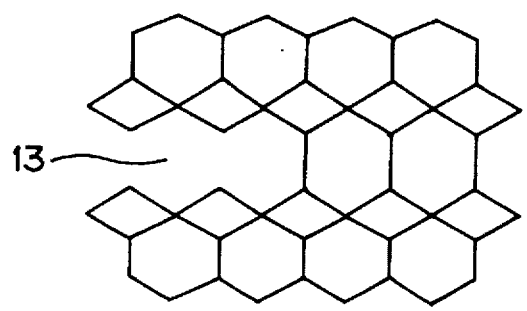
FIG. 14 is a sectional view showing an example of the electrically heatable honeycomb body of the present invention wherein the cells in the vicinity of each current-concentrating portion have a structure capable of withstanding deformation and the cells at other portions have an easily deformable structure.
Figure 15:
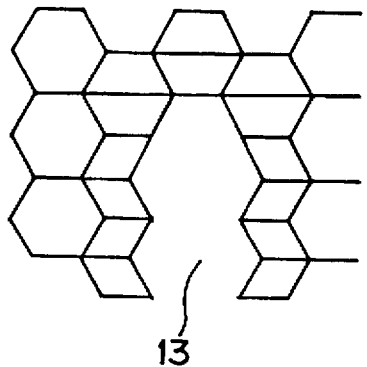
FIG. 15 is a sectional view showing an example of the electrically heatable honeycomb body of the present invention wherein the cells in the vicinity of each current-concentrating portion have a structure capable of withstanding deformation and the cells at other portions have an easily deformable structure.
Figure 16:
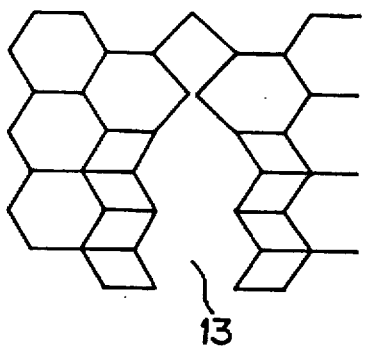
FIG. 16 is a sectional view showing an example of the electrically heatable honeycomb body of the present invention wherein the cells in the vicinity of each current-concentrating portion have a structure capable of withstanding deformation and the cells at other portions have an easily deformable structure.
Figure 17:
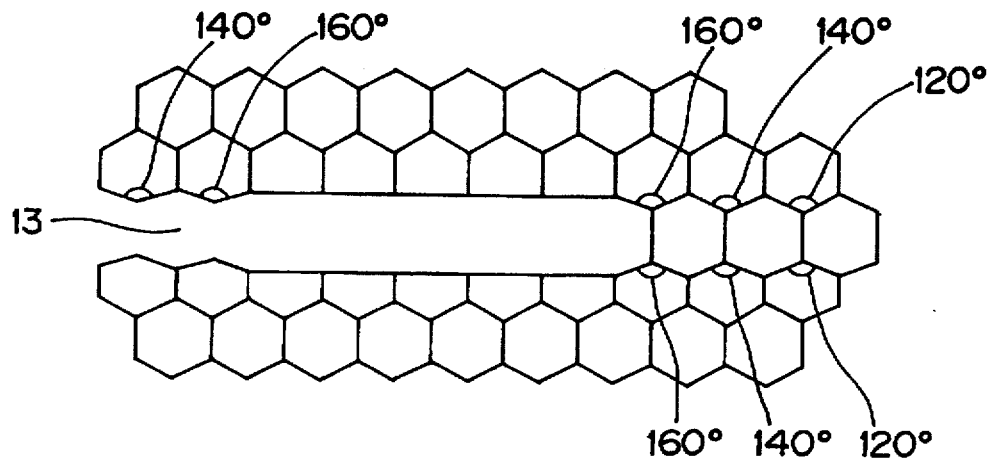
FIG. 17 is a sectional view showing an example of the electrically heatable honeycomb body of the present invention wherein the cells in the vicinity of each current-concentrating portion have a structure capable of withstanding deformation and the cells at other portions have an easily deformable structure.
Figure 18:
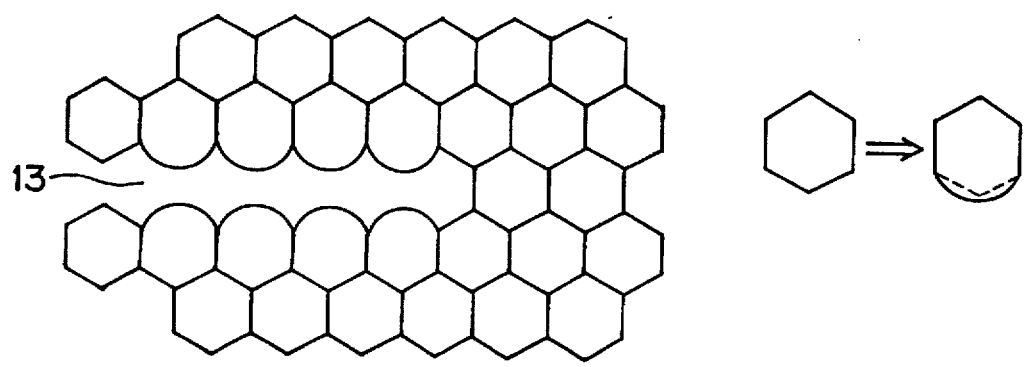
FIG. 18 is a sectional view showing an example of the electrically heatable honeycomb body of the present invention wherein the cells in the vicinity of each current-concentrating portion have a structure capable of withstanding deformation and the cells at other portions have an easily deformable structure.

FIG. 12 is an example wherein, in the cells 18 present an both sides of the end of each slit 13, those partition walls 20 facing the slit 13 are made so as to form a straight line. FIG. 13 is an example wherein, in the cells 18 present an both sides of the end of each slit 13, those partition walls 20 facing the slit 13 are made so as to form a straight line and, moreover, the few cells 21 present in the extension line of the slit 13 are made so as to have a tetragonal shape. FIG. 14 is an example wherein the cells 18 at the portion surrounding the end of each slit 13 are made so as to have a rhombic shape. FIGS. 15 and 16 are each an example wherein, in the cells 18 at the portion surrounding the end of each slit 13, the cell density is increased. FIG. 17 is an example wherein, in the cells 18 at the portion surrounding the end of each slit 13, those partition walls 20 facing the slit 13 are made so as to form a straight line and, moreover, the few cells at each end of the straight portion of slit are made so that the angles of their apexes change gradually and each cell at the furthest positions from the ends of the slit straight portion has a nearly regular hexagonal shape. FIG. 18 is an example wherein, in the cells 18 at the portion surrounding the end of each slit 13, those partition walls 20 facing the slit are made so as to have an arc shape.

Thus, cell deformation and higher stress caused by current concentration and temperature rise, which appear in the vicinity of each current-concentrating portion of honeycomb body or at the portion surrounding each slit end, of slits-containing honeycomb body, can be prevented by allowing the cells 18 present in the above vicinity or at the above portion to have a structure capable of withstanding deformation, for example, a tetragonal shape and the cells present at other portions to have an easily deformable structure.

Tetragonal cells are disclosed also in the above-mentioned Japanese Patent Application Kokai (Laid-Open) No. 277481/1992, but one same tetragonal cell structure is used in all portions, i.e. at current-concentrating portions and other portions. In such a structure (one same cell structure in all portions), stress appears and concentrates in the vicinity of each current-concentrating portion. Some of the present Examples employs a higher cell density in the vicinity of each current-concentrating portion, wherein the heat generated at the current-concentrating portion is dissipated toward the surrounding area and decrease in temperature is resulted.

Figure 19:
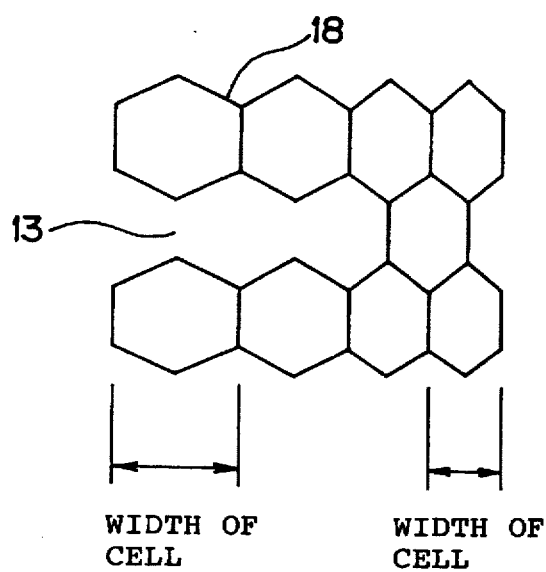
FIG. 19 is a sectional view showing an example of the electrically heatable honeycomb body of the present invention wherein those cells present at the portion surrounding each slit end are provided in a more packed state than the cells at other portions and wherein the width of cell is made gradually smaller from each slit end toward the circumference of honeycomb body.

FIG. 19 is a sectional view showing an example of the electrically heatable honeycomb body of the present invention wherein those cells 18 present at the portion surrounding the end of each slit 13 are provided in a more packed state than the cells at other portions and wherein the width of cell is made gradually smaller from the end of each slit toward the circumference of honeycomb body. With such a cell structure, the temperature rise at each current-concentrating portion during electrification can be reduced because the heat generated at the portion can be dissipated toward the surrounding area. Further, since the portion adjacent to the current-concentrating portion but closer to the circumference has a higher cell density, the heat generated at the current-concentrating portion can be dissipated toward the portion of higher cell density.

In the above cell structure, the degree of increase in cell density is preferably 2–10% and the degree of decrease in cell width toward circumference is preferably 2–10%.

Figure 20:
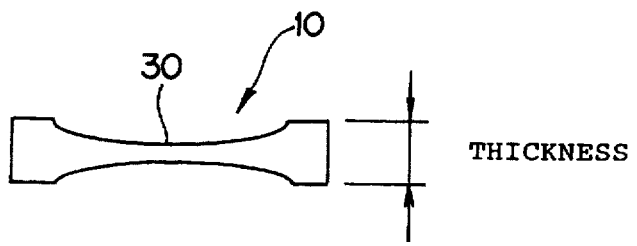
FIG. 20 is a side view showing an example of the electrically heatable honeycomb body of the present invention wherein the two ends, i.e. the gas inlet side and the gas outlet side are made hollow at the respective centers.
Figure 21:
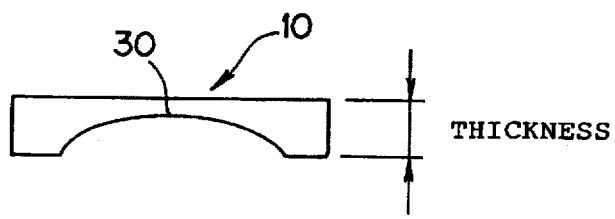
FIG. 21 is a side view showing an example of the electrically heatable honeycomb body of the present invention wherein one of the two ends, i.e. the gas inlet side or the gas outlet side is made hollow at the center.

FIGS. 20 and 21 are each a side view showing an example of the electrically heatable honeycomb body of the present invention wherein one end or two ends, i.e. the gas inlet side and/or the gas outlet side of honeycomb body 10 is made hollow at the center 30. In this honeycomb structure, unlike the structure shown in the above-mentioned Japanese Patent Application Kokai (Laid-Open) No. 163888/1995, the thickness of honeycomb body is not changed sharply from a particular position but is changed gradually.

In such a honeycomb structure, the end of each slit (where current concentration takes place when electrified) and the portion adjacent thereto but closer to the circumference of honeycomb body 10 have large thicknesses because they are near the circumference; therefore, current concentration occurring in the vicinity of the end of each slit can be relaxed and the cell temperatures therein can be reduced. Further, since the honeycomb body has a larger thickness at the portion closer to the circumference, the heat generated at each current-concentrating portion can be quickly dissipated toward the portion. Furthermore, a larger thickness at the circumferential portion gives a honeycomb body of high overall strength. The thickness of the center 30 of honeycomb body is preferably 20–40% of the circumferential thickness of honeycomb body.

A honeycomb body having a larger thickness at the circumferential portion is shown also in Japanese Patent Application Kokai (Laid-Open) No. 163888/1995. In his honeycomb body, however, the thickness is changed sharply from a particular position and current concentration takes place at the position during electrification, which may cause cell rupture at the position.

Figure 22:
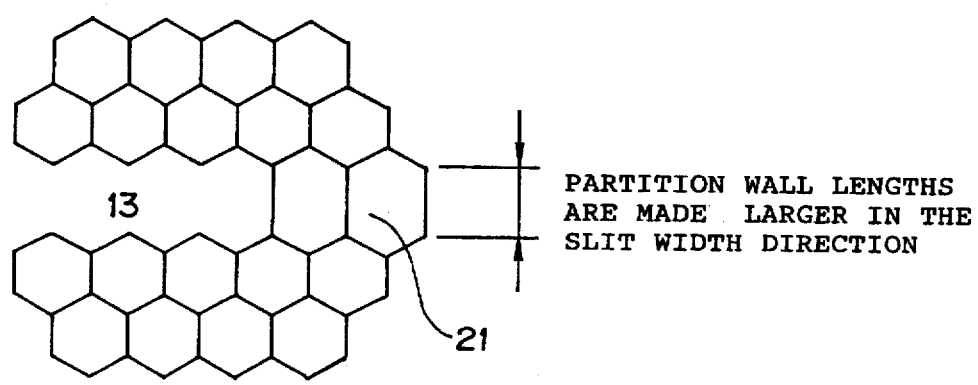
FIG. 22 is a sectional view showing an example of the electrically heatable honeycomb body of the present invention wherein the partition wall lengths of each cell present at each slit dead end and in the slit extension line are made larger in the slit width direction.

FIG. 22 is a sectional view showing an example of the electrically heatable honeycomb body of the present invention wherein the partition wall lengths of the cells 21 present at the dead end of each slit 13 and in the slit extension line are made larger in the slit width direction. In such a cell structure, no cell-to-cell contact between the cells present on both sides of the end of each slit 13 takes place even when the gap of the slit 13 is decreased by the thermal expansion caused by temperature rise during electrification of the honeycomb body.

In the above cell structure, the partition wall lengths of the cells 21 present at each slit end and in the slit extension line, in the slit width direction is preferably about 1.2–1.4 times the partition wall lengths of cells at other portions, to prevent the cell-to-cell contact between the cells present at the both sides of the end of each slit 13.

Examples of the effects of the honeycomb bodies described in the above Examples are shown below.

Figure 25:
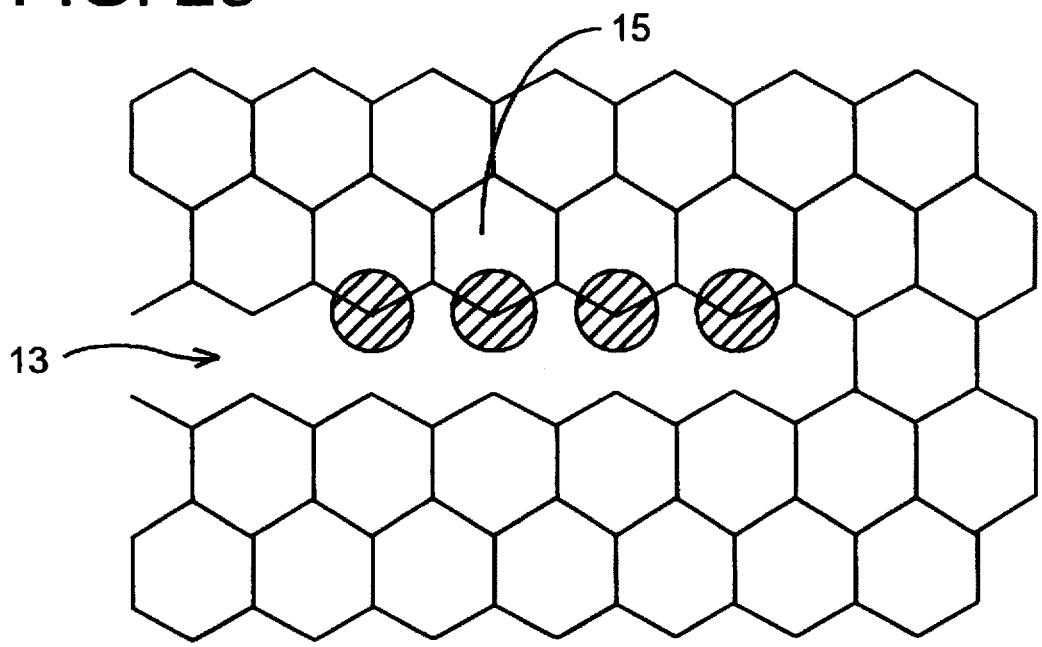
FIG. 25 is a fragmentary view showing each slit end in a conventional electrically heatable honeycomb body.
Figure 26:
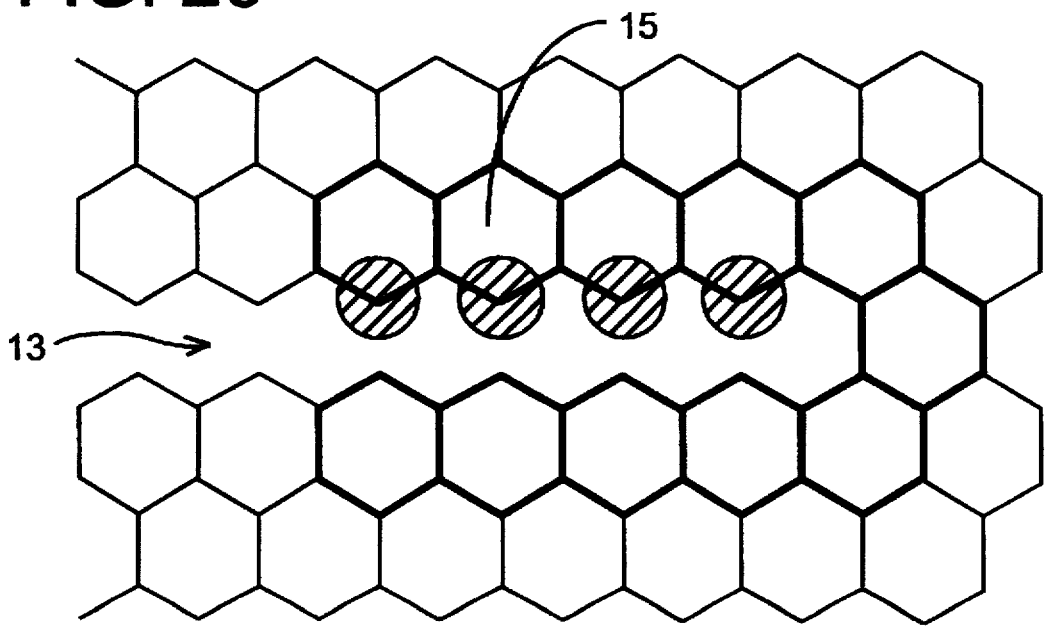
FIG. 26 is a fragmentary view showing an example of the electrically heatable honeycomb body of the present invention wherein the thicknesses of those partition walls present in the vicinity of each current-concentrating portion are made larger than the thicknesses of the partition walls at other portions.
Figure 27A:
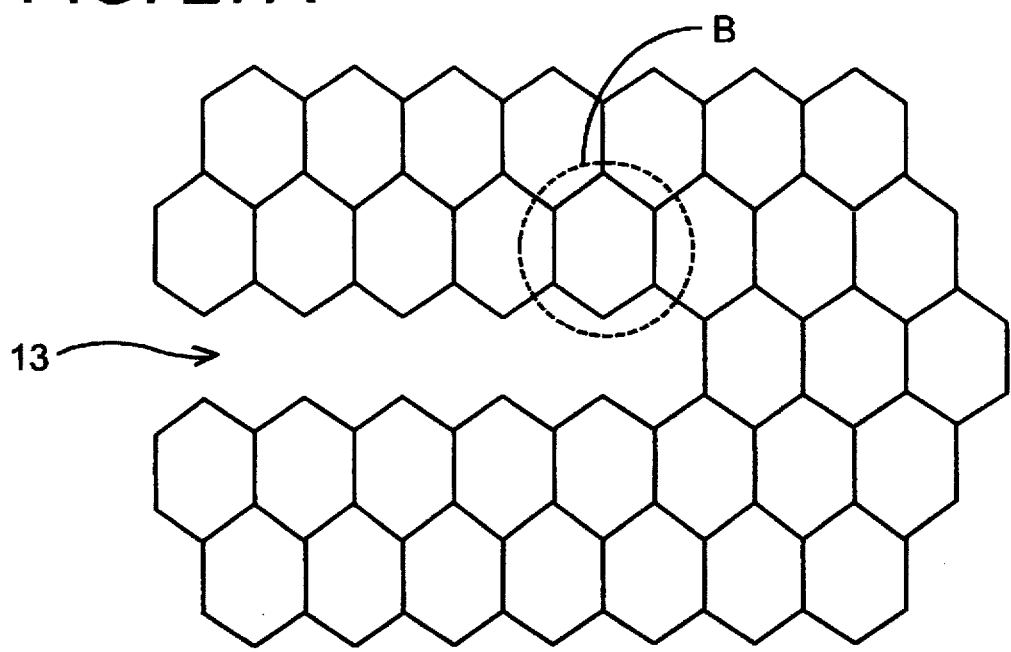
FIGS. 27A–B are views showing an example of the deformation of slit end during heating, in a conventional electrically heatable honeycomb body.
Figure 27B:
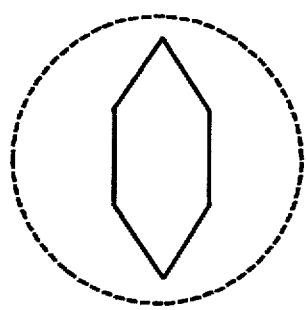
Figure 28:
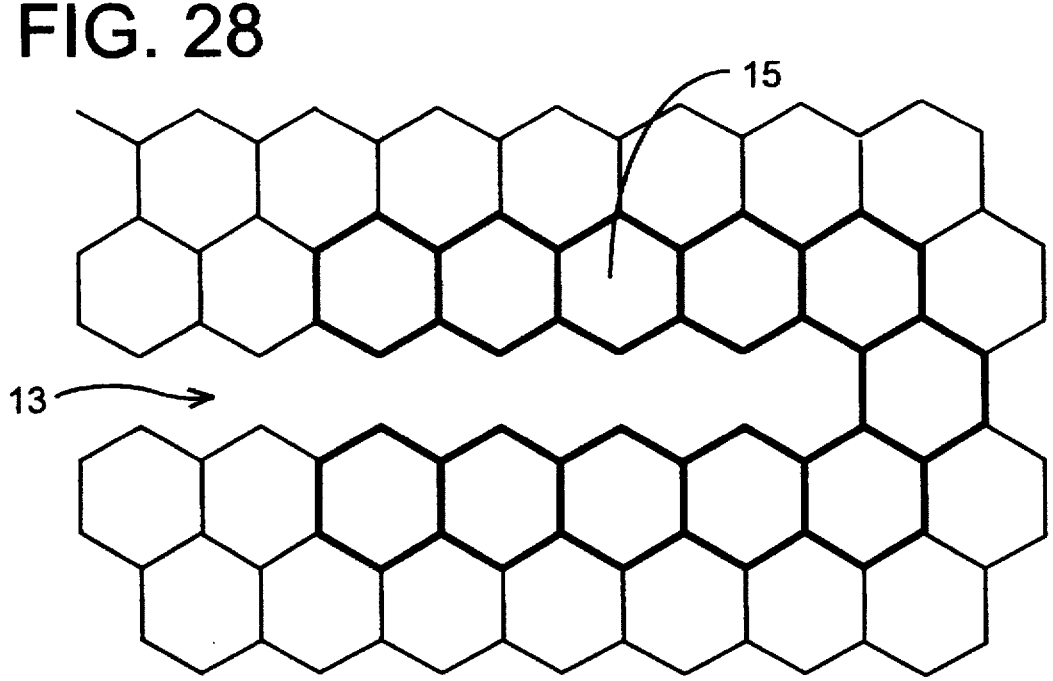
FIG. 28 is a view showing an example of the electrically heatable honeycomb body of the present invention wherein the thicknesses of the partition walls in the vicinity of each current-concentrating portion are made larger to prevent deformation during heating.

Simulation tests were made using model honeycomb bodies wherein the thicknesses of partition walls present in the vicinity of each current-concentrating portion were made larger. In the honeycomb body of FIG. 26 where the thickness of partition walls in the vicinity of each current-concentrating portion was made 30% larger than those at other portions, the stress in the vicinity (the shadowed areas of FIG. 26) of each current-concentrating portion was reduced to about 70% of the stress in the shadowed areas of FIG. 25 (conventional honeycomb body). In the honeycomb bodies of FIGS. 2 and 3, as compared with the conventional honeycomb body, there was also temperature decrease in each current-concentrating portion. With respect to the cell deformation during electrification, there was cell deformation at the portion surrounding each slit end in the conventional honeycomb body of FIGS. 27A–B; in contrast, in the honeycomb bodies of the present invention, there was substantially no deformation as seen in FIG. 28.

Figure 29:
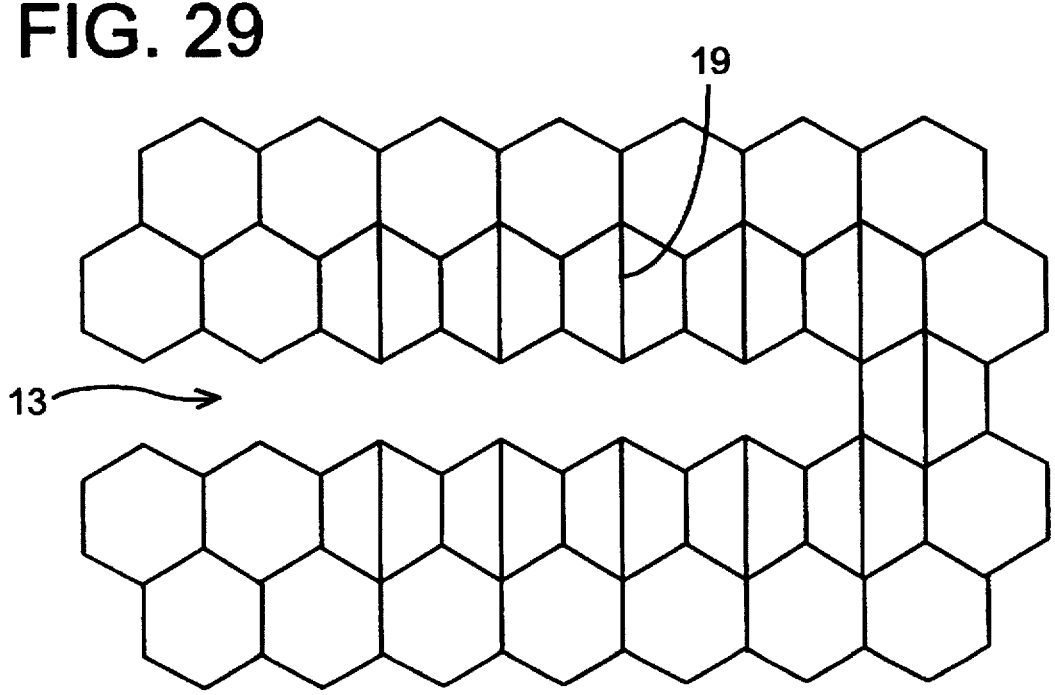
FIG. 29 is a view showing an example of the electrically heatable honeycomb body of the present invention wherein the cells in the vicinity of each current-concentrating portion are each provided with a rib to prevent deformation during heating.

Also when the cells at the portion surrounding each slit end were provided with ribs for reinforcement, there was no deformation as seen in FIG. 29.

As described above, in the honeycomb bodies of claims 1–13 according to the present invention, change was made in the thickness and shape of partition walls present at each portion where cell rupture tends to occur during repeated electrification. As a result, the stress generated by current concentration can be reduced and the cell rupture caused by generated stress can be prevented.

In the honeycomb body of claim 14 according to the present invention, the partition wall lengths of cells at the dead end of each slit and in the slit extension line were made larger in the slit width direction. As a result, the cell-to-cell contact, which occurs between the cells present at the both sides of the end of each slit during electrification and heat generation, can be prevented and stable heat generation without short-circuiting is made possible.

What is claimed is:

1. An electrically heatable honeycomb body comprising:

a plurality of passages extending through the length of the honeycomb body, each of said passages being defined by partition walls comprising an electroconductive material and each of said passages being substantially parallel to the direction of gas flow through the honeycomb body, two ends corresponding to the gas inlet and outlet sides of the honeycomb body, at least one slit for controlling heat generation of the honeycomb body, and means for reducing stress at a current concentration portion of said at least one slit caused by current concentration during heat generation of the honeycomb body, said means being located substantially along a side of said at least one slit toward a dead-end thereof.

2. A honeycomb body according to claim 1, wherein the thicknesses of partition walls present in the vicinity of each current-concentrating portion are thicker than the thicknesses of the partition walls at other portions.

3. A honeycomb body according to claim 1, wherein the thicknesses of partition walls present in the vicinity of each current-concentrating portion and in the portion extending therefrom toward the circumference of the honeycomb body are gradually increase as the partition walls approach the circumference.

4. A honeycomb body according to claim 1, wherein the thicknesses of partition walls present at the portion surrounding each slit end are thicker than the thicknesses of the partition walls at other portions.

5. A honeycomb body according to claim 1, wherein the thicknesses of partition walls present at the portion surrounding each slit end are thicker at the intersection points of such partition walls.

6. A honeycomb body according to claim 5, wherein the thicknesses of the intersection points of partition walls gradually increase as the intersection points approach the lengthwise exterior of the honeycomb body.

7. A honeycomb body according to claim 1, wherein each cell present at the portion surrounding each slit end comprises a rib for reinforcement.

8. A honeycomb body according to claim 1, wherein passages present at the portion surrounding each slit end are sealed with an electroconductive material.

9. A honeycomb body according to claim 1, wherein cells present in the vicinity of each current-concentrating portion are less deformable and flexible than cells at other portions.

10. A honeycomb body according to claim 1, wherein said means for reducing stress comprises at least five cells extending along each side of the slit adjacent the end of the slit.

11. A honeycomb body according to claim 9, wherein the cells present in the vicinity of each current-concentrating portion have a tetragonal section and the cells at other portions have a hexagonal section.

12. A honeycomb body according to claim 1, wherein cells present at the portion surrounding each slit end are more densely packed than the cells at other portions.

13. A honeycomb body according to claim 1, wherein the gas inlet side and/or the gas outlet side is hollow at the center thereof.

14. An electrically heatable honeycomb body comprising:

a plurality of passages each of said passages being defined by partition walls comprising an electroconductive material and each of said passages being substantially parallel to the direction of gas flow through the honeycomb body, two ends corresponding to the gas inlet and outlet sides of the honeycomb body, at least one slit in the honeycomb body for adjusting the flow of electricity in the honeycomb body thereby controlling heat generation of the honeycomb body, and means for reducing stress caused by current concentration during heat generation of the honeycomb body, said means including a cell present at the dead-end of the slit and in the slit extension line larger in the slit width direction than cells at other portions to prevent cell-to-cell contact between cells present at both sides of the slit end during heat generation by electrification.

* * * * *